United States Patent [19]
Yamashita et al.

[11] Patent Number: 5,452,147
[45] Date of Patent: Sep. 19, 1995

[54] DATA READING MECHANISM FOR DISK APPARATUSES FOR REPRODUCING DATA AND SERUM INFORMATION RECORDED ON A RECORDING MEDIUM BY A MULTI-ZONE RECORDING METHOD

[75] Inventors: Mitsunori Yamashita; Hiroshi Nakashima, both of Tokyo; Osamu Miyazaki, Ibaragi, all of Japan

[73] Assignee: NEC Corporation, Tokyo, Japan

[21] Appl. No.: 124,230

[22] Filed: Sep. 21, 1993

[30] Foreign Application Priority Data

Sep. 28, 1992 [JP] Japan .................. 4-257849

[51] Int. Cl.⁶ .................. G11B 5/09; G11B 15/12
[52] U.S. Cl. .................. 360/46; 360/61
[58] Field of Search .................. 360/46, 27, 61, 65, 360/69

[56] References Cited

U.S. PATENT DOCUMENTS

| | | | |
|---|---|---|---|
| 4,244,008 | 1/1981 | Holt | 360/65 |
| 4,644,419 | 2/1987 | Iinuma et al. | 360/46 |
| 4,656,533 | 4/1987 | Sakai et al. | 360/46 |
| 4,870,514 | 9/1989 | Enami et al. | 360/61 |
| 5,321,559 | 6/1994 | Nguyen et al. | 360/65 |

OTHER PUBLICATIONS

JP reference No. 3-42517, Abstract, Ishii et al., May 14, 1991.

*Primary Examiner*—W. R. Young
*Assistant Examiner*—Won Tae C. Kim
*Attorney, Agent, or Firm*—Sughrue, Mion, Zinn, Macpeak & Seas

[57] ABSTRACT

Each track on a recording medium 1 is divided into a plurality of sectors, each of which comprises a head positioning information area and a data area. Signals read out of the recording medium 1 undergo wave shaping by a low-pass filter 4 and a differentiating circuit 5. An index pulse generator 8 generates an index pulse indicating the reference position of each track on the basis of an index hole detected by a detector 7. A control circuit 20, on the basis of the index pulse, generates a control signal for distinguishing the head positioning information area and the data area from each other. The low-pass filter 4 and the differentiating circuit 5, each in accordance with a control signal, switch between their two frequency characteristics.

4 Claims, 4 Drawing Sheets

DATA READING MECHANISM FOR DISK APPARATUSES FOR REPRODUCING DATA AND SERUM INFORMATION RECORDED ON A RECORDING MEDIUM BY A MULTI-ZONE RECORDING METHOD

BACKGROUND OF THE INVENTION

The present invention relates to a data reading mechanism for disk apparatuses, and more particularly to a data reading mechanism for faithfully reproducing data and sector servo information recorded on a magnetic recording medium a multi-zone recording (MZR) system.

In a disk apparatus according to the prior art, for instance a magnetic disk apparatus using a sector servo system, each track on the magnetic recording medium is divided into a plurality of sectors, each of which is provided with a positioning information area, into which magnetic head positioning information is written, and a data area, into which recorded data are written. In this magnetic disk apparatus, while a lower recording frequency is used for recording magnetic head positioning information than for data, a low-pass filter, adjusted to the optimal frequency characteristic for reading out the data written into the data area, and a differentiating circuit are used to reproduce the magnetic head positioning information and the data when they are to be read out of the magnetic recording medium.

However, in an MZR system, since the recording efficiency is increased by equalizing the bit recording densities on the inner and outer circumferences of the magnetic recording medium, the data recording frequency on the outer circumference of the recording medium is higher than that on the inner circumference. On the other hand, the recording frequency in the head positioning information area is constant irrespective of the position of the recording medium. As a result, in an MZR system, the recording frequency in the data area and that in the head positioning information area may greatly differ from each other.

If the recording frequency in the data area greatly differs from that in the head positioning information area, there will occur a decline in the read margin of the magnetic head positioning information reproduced by the low-pass filter and the differentiating circuit, which are adjusted to the recording frequency in the data area. As a result, in the worst case, there will arise a read error in the magnetic head position information, and the positioning of the magnetic head will be thereby made difficult.

SUMMARY OF THE INVENTION

According to the invention, there is provided a data reading mechanism for disk apparatuses for reproducing from a recording medium, on which a head positioning information area and a data area are written into each of the sectors formed by dividing each track, said head positioning information and said data in accordance with a signal read out by the head, comprising:

wave shaping means for supplying wave-shaped signals by subjecting input signals, which have been read out of said recording medium, to low-pass filtering and differentiation, said wave shaping means having at least two input/output transfer characteristics, one of which is selected in accordance with a control signal and assigned to said input signals;

index pulse generating means for detecting, from a spindle motor on which said recording medium is mounted, an index pulse indicating the reference position of each track, and supplying that index pulse; and control signal generating means for generating said control signal indicating, on the basis of said index pulse, whether the head is reading out the head positioning information area or the data area in a sector on said recording medium.

DETAILED DESCRIPTION OF THE PREFERRED EMBODIMENTS

Figure 1:
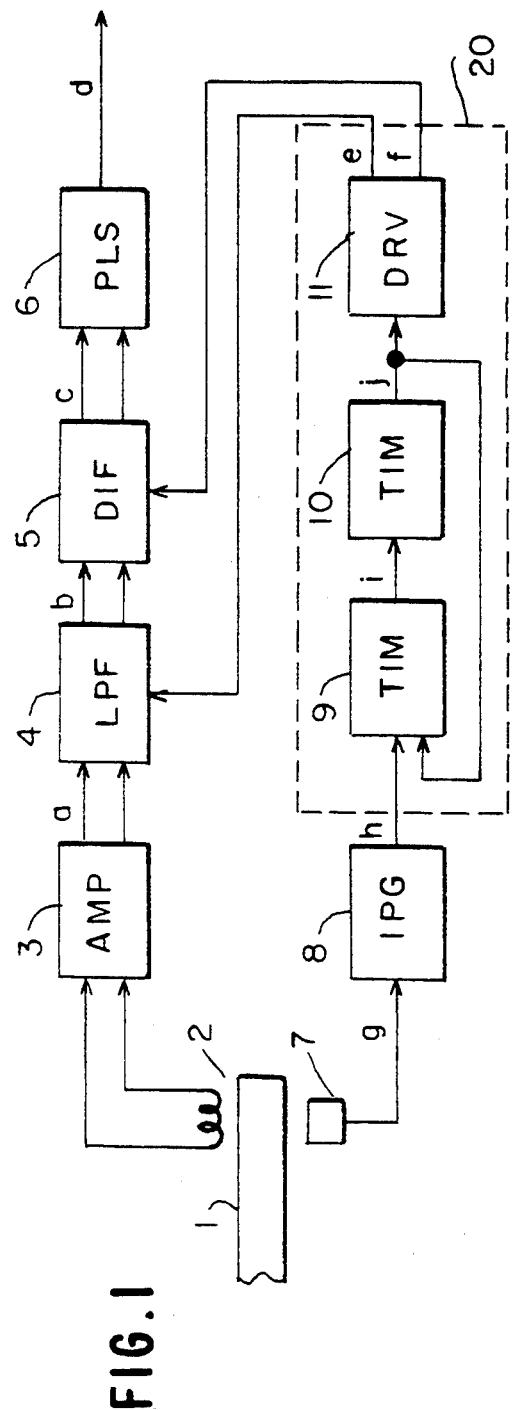
FIG. 1 is a block diagram illustrating a first preferred embodiment of the present invention.

FIG. 1 is a block diagram illustrating a first preferred embodiment of the present invention. This first embodiment of the invention is provided with an amplifier 3 for amplifying a read signal containing magnetic head positioning information and data read out a magnetic recording medium 1 by a magnetic head 2; a low-pass filter (LPF) 4 for removing high-frequency noise contained in the output of the amplifier 3; a differentiating circuit 5 for differentiating the output (b) of the low-pass filter 4; and a pulser 6 for pulsing the output (c) of the differentiating circuit 5 and reproducing said magnetic head positioning information and data (d). The first embodiment of the invention is further provided with a detector 7 for detecting the reference position of the track from the magnetic recording medium 1; an index pulse generator 8 for generating an index pulse from the detection signal of the detector 7; and a control signal generating circuit 20 for supplying the low-pass filter 4 and the differentiating circuit 5 with control signals (e, f) for controlling the low-pass filter characteristic of the low-pass filter 4 and the differentiating characteristic of the differentiating circuit 5, respectively, on the basis of a clock pulse (CLK) supplied from a clock source (not shown).

Next will be described the operation of this preferred embodiment. Data and sector-by-sector magnetic head positioning information written into each sector of the magnetic recording medium 1 are read out by the magnetic head 2 and entered into the amplifier (AMP) 3 to be amplified. The read signal amplified by this read amplifier 3 is entered into the LPF 4 via a signal line a to be cleared of high-frequency noise. The control signal sent from the control signal generating circuit 20 via a control signal line e adjusts the frequency band of the LPF 4 to the data recording frequency in the data area or, when passing the magnetic head positioning information, sets it in a frequency band adjusted to the recording frequency of the magnetic head positioning information, which is recorded at a frequency lower than the data recording frequency. Details of this LPF 4 will be described below with reference to FIG. 3.

The read signal, cleared of high-frequency noise by the LPF 4 in the bands adjusted to the respective recording frequencies of the data and the magnetic head positioning information, is supplied to the differentiating circuit 5 via a signal line b. The frequency band of the differentiating circuit 5 at this time is set by the control signal, sent from the control signal generating circuit 20 via a control signal line f, in the frequency band of a differential characteristic adjusted to the data recording frequency when in the data area or, when the magnetic head position information is to be differentiated, in the frequency band of another frequency characteristic adjusted to the recording to the magnetic head positioning information, which is recorded at a lower frequency than the data recording frequency. Details of this differentiating circuit 5 will be described below with reference to FIG. 4. The read signal, differentiated by the differentiating circuit 5 in the bands adjusted to the respective recording frequencies of the data and the magnetic head positioning information, is sent to the pulser (PLS) 6 via a signal line c to be supplied as reproduced data and magnetic head positioning information d.

The detector 7 is a magnetic sensor to detect the index detection hole of the spindle motor to which the magnetic recording medium is fitted. This index detection, measuring about 3 mm in diameter and about 1 mm in depth, is provided in the rotor of the spindle-motor, and the detector 7 detects the magnetic variation resulting from the passage of this small hole before the detector 7. Incidentally, when the magnetic recording medium is formated, the starting position of the first sector of each track is determined when this small hole is detected. Therefore, the detection of the small hole by the detector 7 during the reading out of information from the magnetic recording medium means that the magnetic head has begun reading the magnetic head positioning information area of the first sector of the track.

The detection signal g of the detector 7 is sent to the index pulse generator (IPG) 8 to generate an index pulse h. This index pulse takes on a high level only during the period in which the magnetic head reads out the magnetic head positioning information area in the first sector of each track.

Now will be described the configuration and operation of the control signal generating circuit 20. As shown in FIG. 1, the control signal generating circuit 20 consists of a first timer 9 for generating a data area count signal i from the index pulse g, an area distinguishing signal j for indicating the distinction between the magnetic head positioning information area and the data area, and a clock (CLK) supplied from a clock source (not shown); a second timer 10 for generating the area distinguishing signal j from the data area count signal i and the clock; and a drive circuit 11 for generating the control signals e and f for switching the frequency characteristics of the low-pass filter 4 and the differentiating circuit 5 on the basis of the area distinguishing signal j.

Figure 2:
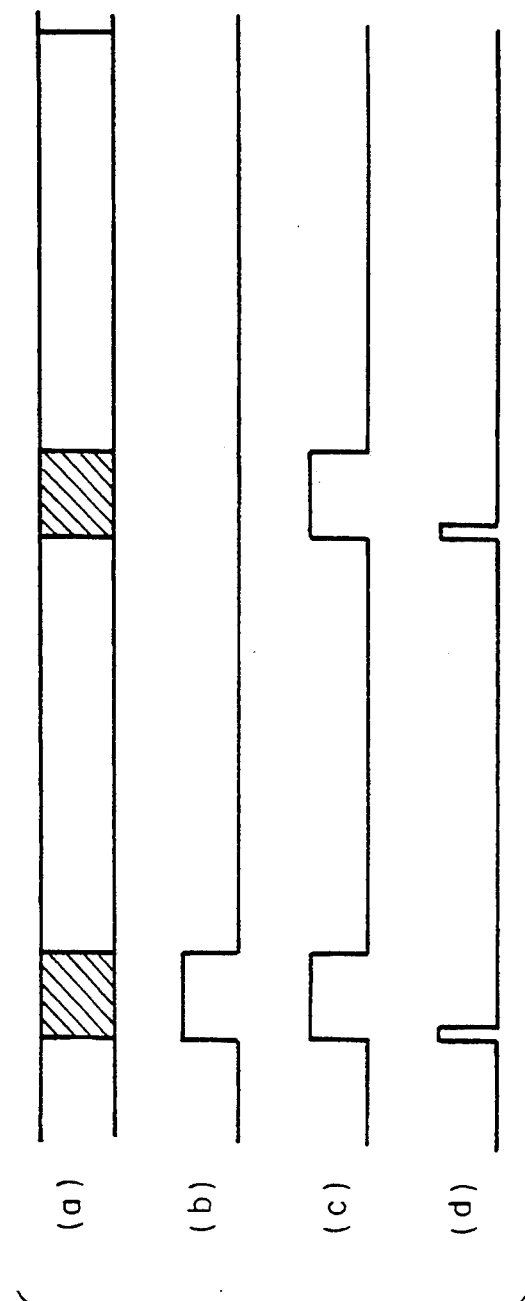
FIGS. 2a–d is a timing chart for describing the operation of the control circuit 20 in FIG. 1.

The operation of the control circuit 20 will be described with reference to the timing chart of FIG. 2. In FIG. 2, (a) shows the magnetic head positioning information area (the hatched parts of the chart) and the data area read out by the magnetic head; (b), the index pulse h; (c), the area distinguishing signal j; and (d), the data area count signal i.

The first timer 9 starts counting the clocks (CLK) when at least either the index pulse h or the area distinguishing signal j rises to a high level and later falls to a low level. The period in which the index pulse and/or the area distinguishing signal are/is at the high level, as shown in FIGS. 2 (b) and (c), coincides with the period in which the magnetic head is reading the magnetic head positioning information area. The first timer 9, when it has counted the clocks only as long as the length of time required by the magnetic head to read out the data region, supplies the data area count signal i whose level is high only in a one-clock width as shown in FIG. 2 (d).

The second timer 10, when the data area count signal rises to a high level, supplies a signal which takes on a high level only as long as the length of time required by the magnetic head to read out the magnetic head positioning information area as shown in FIG. 2 (c), i.e. the area distinguishing signal j. As stated above, this area distinguishing signal is supplied to the drive circuit (DRV) 11, which generates the control signals e and f for switching the frequency characteristics of the low-pass filter 4 and the differentiating circuit 5, respectively.

Figure 3:
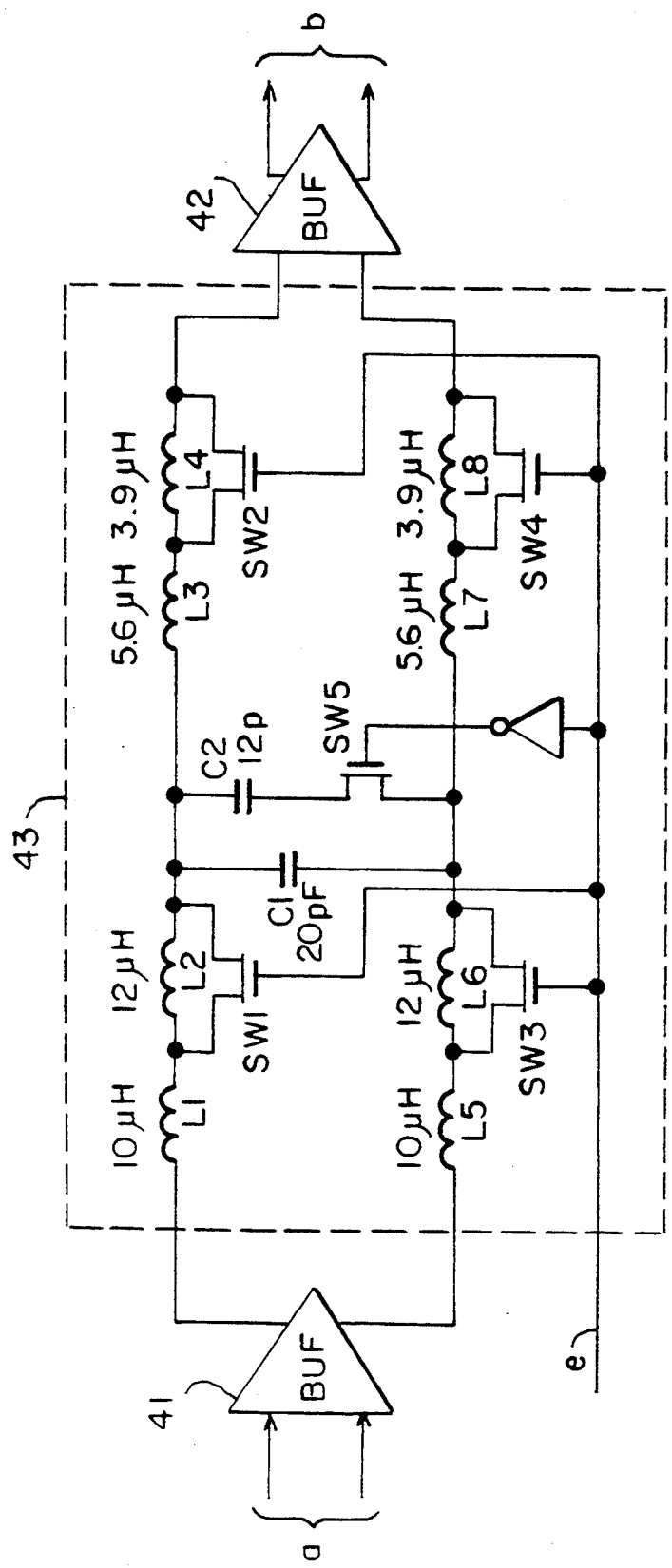
FIG. 3 is a circuit diagram illustrating an example of the configuration of the low-pass filter 4 in FIG. 1.

Now will be described, with reference to FIG. 3, a typical configuration and operation of the low-pass filter 4. As shown in FIG. 3, in the LPF 4, a buffer amplifier 41 to which the differential output a of the amplifier 3 of FIG. 1, inductors L1 through L4 and inductors L5 through L8, both connected in series, are connected in a differential configuration, and connected to a buffer amplifier 42. There further are capacitors C1 and C2 between the connecting point between the inductors L2 and L3 and that between the inductors L6 and L7. The LPF 4 also includes analog switches SW1, SW2, SW3 and SW4, whose input/output terminals are connected to between the two terminals each of the inductors L2, L4, L6 and L8 and to whose control input terminals is supplied the control signal e, and another analog switch SW5 whose input/output terminals are connected to between one of the terminals of the capacitor C2 and the connecting point between the inductors L6 and L7 and to whose control input terminal is supplied the control signal e.

When the control signal e is at a low level, i.e. when the magnetic head is reading out the magnetic head positioning information area in each sector, the analog switches SW1 through SW4 are off, and the analog switch SW5 is on, so that the circuit 43 in FIG. 3 operates as a low-pass filter consisting of the inductors L1 through L8 and the capacitors C1 and C2.

Or when the control signal e is at a high level, i.e. when the magnetic head is reading out the data area in each sector, the analog switches SW1 through SW4 are on, and the analog switch SW5 is off, so that the circuit 43 in FIG. 3 operates as a low-pass filter consisting of the inductors L1, L3, L5 and L7 and the capacitor C1.

As a result the pass band of the circuit 43 is narrower when the control signal e is at the low level, i.e. when the magnetic head is reading out the magnetic head positioning information area in each sector.

Figure 4:
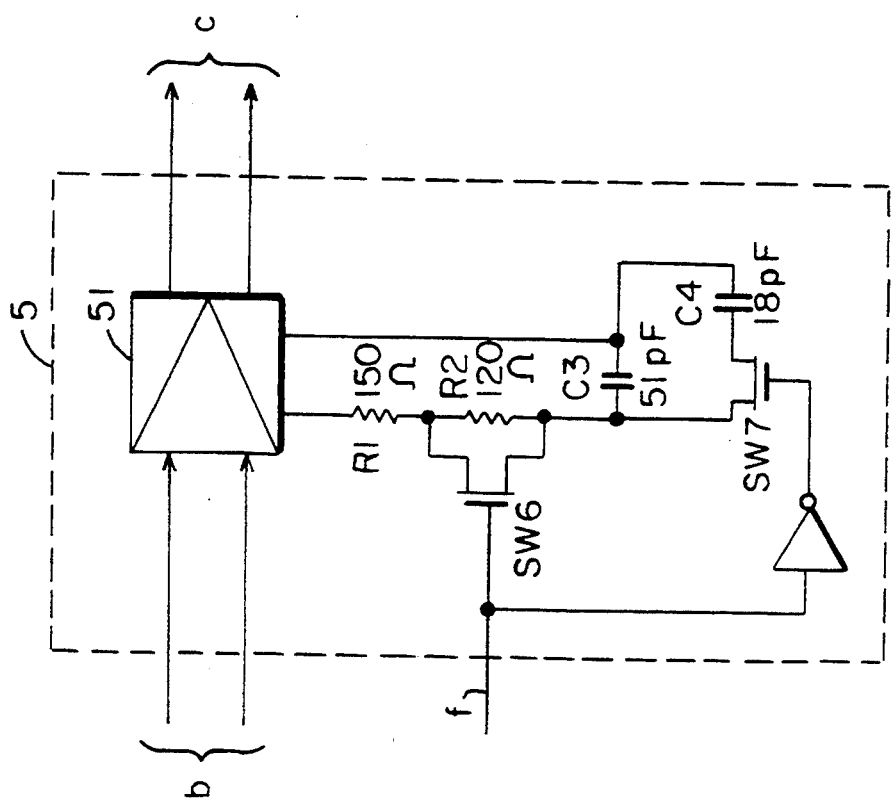
FIG. 4 is a circuit diagram illustrating an example of the configuration of the differentiating circuit 5 in FIG. 1.

Next will be described, with reference to FIG. 4, a typical configuration and operation of the differential circuit 5. As illustrated in FIG. 4, the differential circuit 5 includes a linear amplifier 51 to which the differential output b the LPF 4 of FIG. 1 is connected; resistors R1 and R2 in series connected to the frequency characteristic control terminals of the linear amplifier 51; and capacitor C3 and C4 connected in parallel between the resistor R2 and the frequency characteristic control terminal of the linear amplifier 51. It further includes an analog switch SW6 whose input/output terminals are connected to the two terminals of the resistor R2 and to whose control signal input terminal is supplied the control signal f, and another analog switch SW7 whose input/output terminals are connected to one of the terminals of the capacitor C4 and one of the terminals of the capacitor C3 and to whose control signal input terminal is supplied the control signal f. As this linear amplifier 51 can be used Motorola's differential two-stage video amplifier NE-592.

When the control signal f is at a low level, i.e. when the magnetic head is reading out the magnetic head positioning information area in each sector, the analog switch SW6 is off, and the analog switch SW7 is on, so that the circuit 5 in FIG. 4 performs differential operation in a frequency band determined by the resistors R1 and R2 and the capacitors C3 and C4.

Or when the control signal f is at a high level, i.e. when the magnetic head is reading out the data area in each sector, the analog switch SW6 is on, and the analog switch SW7 is off, so that the circuit 5 in FIG. 4 performs differential operation in a frequency band determined by the resistor R1 and the capacitor C3.

As a result the frequency band of the circuit 5 is narrower when the control signal f is at the low level, i.e. when the magnetic head is reading out the magnetic head positioning information area in each sector.

In the first preferred embodiment of the present invention so far described, the frequency characteristics of the low-pass filter 4 and of the differentiating circuit 5 are simultaneously switched in accordance with the control signals e and f. The invention, however, also permits the characteristic of only one of the two circuits to be switched in accordance with a control signal while keeping that of the other circuit fixed. This alternative is used in the second and third preferred embodiments of the invention.

Figure 5:
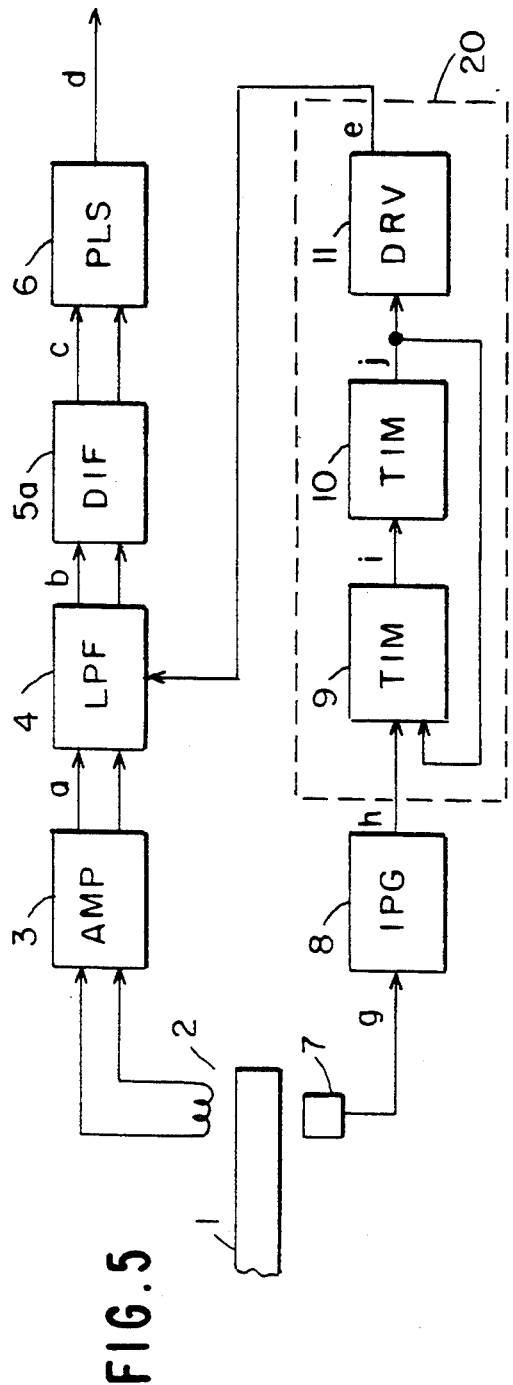
FIG. 5 is a block diagram illustrating a second preferred embodiment of the invention.
Figure 6:
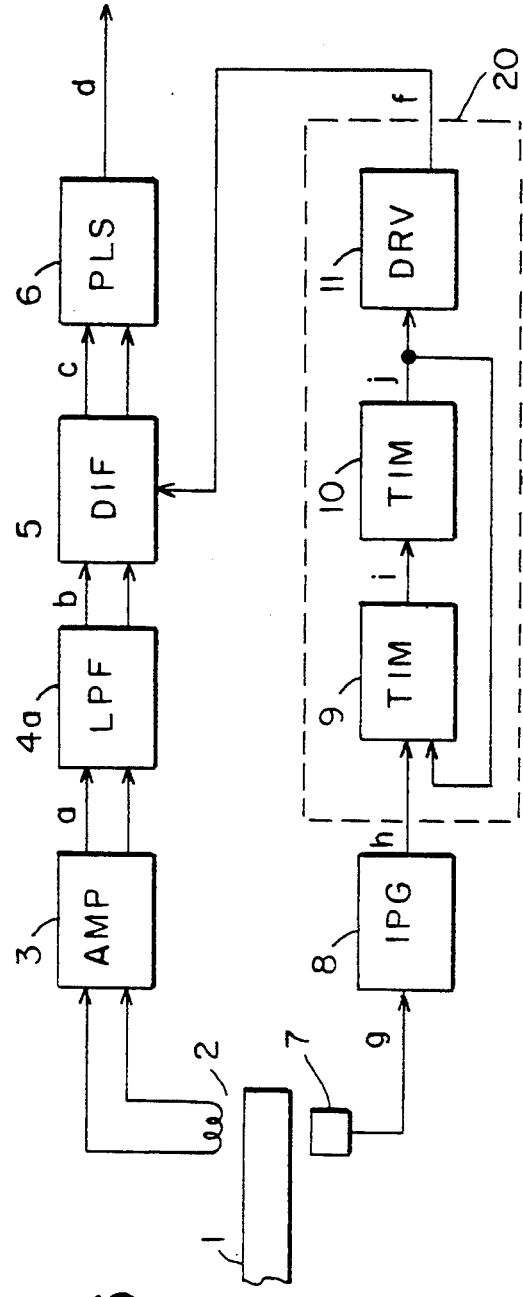
FIG. 6 is a block diagram illustrating a third preferred embodiment of the invention.

FIG. 5 is a block diagram illustrating a second preferred embodiment of the invention, and FIG. 6 is a block diagram showing a third preferred embodiment of the invention. The first and second embodiments differ from each other in that the differentiating circuit 5, whose frequency characteristic is variable, in the former is replaced in the latter by a differentiating circuit 5a, whose frequency characteristic is fixed. The difference between the first and third embodiments consists in that the low-pass filter 4, whose frequency characteristic is variable, in the former is replaced in the latter by a low-pass filter 4a, whose frequency characteristic is fixed. Since the operations of all other circuits in the second and third embodiments are the same as those of the corresponding ones in the first embodiment, their description is dispensed with.

Although the foregoing took up a magnetic disk apparatus as an example in describing preferred embodiments of the present invention, the invention can be similarly applied to optical disk and optomagnetic disk apparatuses.

As hitherto described in detail, the invention can provide a data reading mechanism for disk apparatuses, which is hardly susceptible to read errors even where the recording frequency of the data area widely differs from that of the head positioning information area.

What is claimed is:

1. A data reading mechanism for disk apparatuses, for reproducing head positioning information and data in accordance with a signal read out by the head from a multi-zone recording medium, said medium having a head positioning information area and a data area written into each of the sectors formed by dividing each track, and having bit recording densities equalized on the inner and outer circumferences, said data reading mechanism comprising:

wave shaping means for supplying wave-shaped signals by subjecting input signals, which have been read out of said recording medium, to low-pass filtering and differentiation, said wave shaping means having at least two frequency characteristics, one of which is selected in accordance with a control signal and assigned to said input signals;

index pulse generating means for detecting an index detection hole provided in a spindle motor on which said recording medium is mounted, an index pulse indicating the reference position of each track, and supplying that index pulse; and control signal generating means for generating said control signal indicating, on the basis of said index pulse, whether the head is reading out the head positioning information area or the data area in a sector on said recording medium.

2. The data reading mechanism for disk apparatuses, as claimed in claim 1, where said wave shaping means comprises:

a low-pass filter, having two frequency characteristics, for assigning to said input signals one of the two frequency characteristics selected in accordance with said control signal; and a differentiating circuit, having two frequency characteristics, for assigning to the output of said low-pass filter one of the two frequency characteristics selected in accordance with a control signal, and supplying said wave-shaped signals.

3. The data reading mechanism for disk apparatuses, as claimed in claim 1, wherein said wave shaping means comprises:

a low-pass filter, having two frequency characteristics, for assigning to said input signals one of the two frequency characteristics selected in accordance with said control signal; and a differentiating circuit for assigning to the output of said low-pass filter a fixed frequency characteristic, and supplying said wave-shaped signals.

4. The data reading mechanism for disk apparatuses, as claimed in claim 1, wherein said wave shaping means comprises:

a low-pass filter for assigning to said input signals a fixed frequency characteristic; and a differentiating circuit, having two frequency characteristics, for assigning to the output of said low-pass filter one of the two frequency characteristics selected in accordance with a control signal, and supplying said wave-shaped signals.

* * * * *